(12) United States Patent
Lee (10) Patent No.: US 10,042,753 B2
(45) Date of Patent: Aug. 7, 2018

(54) DATA STORAGE DEVICE FOR STORING DATA STORAGE INFORMATION OF DATA AND METHOD FOR OPERATING THE SAME

(71) Applicant: SK hynix Inc., Gyeonggi-do (KR)

(72) Inventor: Jong-Min Lee, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 174 days.

(21) Appl. No.: 14/567,658

(22) Filed: Dec. 11, 2014

(65) Prior Publication Data
US 2016/0034389 A1 Feb. 4, 2016

(30) Foreign Application Priority Data

Jul. 31, 2014 (KR) .................... 10-2014-0098503

(51) Int. Cl.
*G06F 12/02* (2006.01)
*G06F 12/10* (2016.01)

(52) U.S. Cl.
CPC .. *G06F 12/0238* (2013.01); *G06F 2212/7202* (2013.01); *G06F 2212/7204* (2013.01)

(58) Field of Classification Search
CPC ......... G06F 12/0246; G06F 2212/2022; G06F 12/0238
USPC ........................................ 711/103, E12.008
See application file for complete search history.

(56) References Cited

U.S. PATENT DOCUMENTS

| | | | |
|---|---|---|---|
| 2008/0109589 A1* | 5/2008 | Honda .................. | G06F 3/0607 711/103 |
| 2008/0282024 A1* | 11/2008 | Biswas .............. | G06F 12/0246 711/103 |
| 2009/0150641 A1* | 6/2009 | Flynn ..................... | G06F 3/061 711/202 |
| 2012/0005453 A1* | 1/2012 | Saika ..................... | G06F 3/061 711/207 |
| 2012/0173796 A1* | 7/2012 | Shen .................. | G06F 12/0246 711/103 |
| 2012/0246415 A1 | 9/2012 | Teo | |
| 2013/0185490 A1 | 7/2013 | Mizushima | |
| 2013/0275650 A1* | 10/2013 | Hida ................... | G06F 12/0246 711/102 |
| 2013/0326121 A1 | 12/2013 | Cheng | |
| 2014/0006685 A1* | 1/2014 | Peterson ............. | G06F 12/0238 711/102 |
| 2014/0160038 A1* | 6/2014 | Lee ........................ | G06F 3/044 345/173 |

FOREIGN PATENT DOCUMENTS

| | | |
|---|---|---|
| KR | 1020110059770 | 6/2011 |
| KR | 1020120039166 | 4/2012 |

* cited by examiner

*Primary Examiner* — Tuan Thai
*Assistant Examiner* — Edward Waddy, Jr.
(74) *Attorney, Agent, or Firm* — IP & T Group LLP (57) ABSTRACT

A data storage device includes a memory including a plurality of memory blocks each of which includes a plurality of pages suitable for storing data transmitted from a host, and a controller suitable for storing data storage information on the data stored in the memory, wherein the data storage information is updated based on valid pages where the data are stored among the plurality of pages.

10 Claims, 6 Drawing Sheets

DATA STORAGE DEVICE FOR STORING DATA STORAGE INFORMATION OF DATA AND METHOD FOR OPERATING THE SAME

CROSS-REFERENCE TO RELATED APPLICATIONS

The present application claims priority of Korean Patent Application No. 10-2014-0098503, filed on Jul. 31, 2014, which is incorporated herein by reference in its entirety.

BACKGROUND

1. Field

Exemplary embodiments of the present invention relate to a data storage device, and more particularly, to a data storage device for storing data storage information of data, and a method for operating the data storage device.

2. Description of the Related Art

The computer environment paradigm is shifting to ubiquitous computing systems where people can use computers anytime, anywhere. This increases the usage of portable electronic devices, such as mobile phones, digital cameras, laptop computers and the like. These portable electronic devices generally use data storage devices employing memories. The data storage devices are used as main memory units or secondary memory units of the portable electronic devices.

The data storage devices using memories are excellent in terms of stability and durability because they do not have a moving parts. Also, the data storage devices using memories have the advantages of operating at fast data access rates and with low power consumption. Non-limiting examples of data storage devices having the above-described advantages include Universal Serial Bus (USB) memory devices, memory cards with diverse interfaces, Solid-State Drives (SSD) and so forth.

SUMMARY

An embodiment of the present invention is directed to a data storage device that may efficiently store data storage information of a memory, and a method for operating the data storage device.

In accordance with an embodiment of the present invention, a data storage device includes a memory including a plurality of memory blocks each of which includes a plurality of pages suitable for storing data transmitted from a host, and a controller suitable for storing data storage information on the data stored in the memory, wherein the data storage information is updated based on valid pages where the data are stored among the plurality of the pages, wherein the data storage information is physical to logical information of the data stored in the plurality of the pages and the plurality of the memory blocks, and the physical to logical information is stored in pages of a predetermined memory block among the plurality of the memory blocks, wherein at a first moment when data of a first group are stored in pages of a first group among the plurality of the pages, the controller stores a first data storage information representing that the data of the first group are stored in the pages of the first group, in page of the predetermined memory block, wherein at a second moment when data of a second group are stored in pages of a second group among the plurality of the pages, if data of the first group and data of the second group have at least one or more same value, the controller updates the first data storage information based on the number of first valid pages among the pages of the first group, and wherein the controller compares the number of the first valid pages with a first threshold value and the change in the number of the first valid pages with a second threshold value at the second moment to produce a comparison result, and updates a second data storage information into the updated first data storage information based on the comparison result.

In accordance with another embodiment of the present invention, a method for operating a data storage device includes storing data transmitted from a host in a memory, and storing data storage information on the data stored in the memory, wherein the data are stored in a plurality of pages included in each of a plurality of memory blocks of the memory, and the data storage information is updated based on pages where the data are stored among the plurality of the pages, wherein the data storage information is physical to logical information of the data stored in the plurality of the pages and the plurality of the memory blocks, and the physical to logical information is stored in pages of a predetermined memory block among the plurality of the memory blocks, and wherein the storing of the data storage information includes at a first moment when data of a first group are stored in pages of a first group among the plurality of the pages, storing a first data storage information representing that the data of the first group are stored in the pages of the first group, in page of the predetermined memory block, and at a second moment when data of a second group are stored in pages of a second group among the plurality of the pages, if data of the first group and data of the second group have at least one or more same value, updating the first data storage information based on the number of first valid pages among the pages of the first group, wherein the updating of the first data storage information based on the number of the first valid pages among the pages of the first group includes comparing the number of the first valid pages with a first threshold value and the change in the number of the first valid pages with a second threshold value at the second moment to produce a comparison result, and updating a second data storage information into the updated first data storage information based on the comparison result.

DETAILED DESCRIPTION

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The drawings are not necessarily to scale and, in some instances, proportions may have been exaggerated in order to clearly illustrate features of the embodiments. It is also noted that in this specification, "connected/coupled" refers to one component not only directly coupling another component but also indirectly coupling another component through an intermediate component. In addition, a singular form may include a plural form as long as it is not specifically mentioned in a sentence.

Hereafter, an embodiment of the present invention is described in detail with reference to the accompanying drawings.

Figure 1:
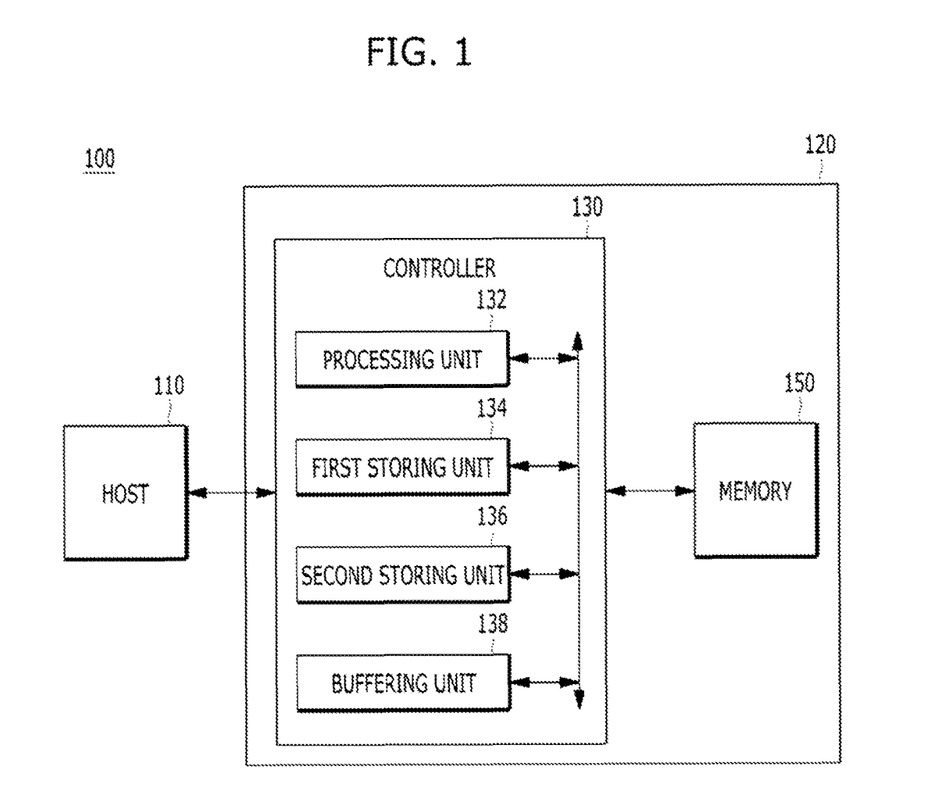
FIG. 1 is a block diagram illustrating a data processing system including a data storage device in accordance with an embodiment of the present invention.

FIG. 1 is a block diagram illustrating a data processing system including a data storage device in accordance with an embodiment of the present invention.

Referring to FIG. 1, the data processing system 100 includes a host 110 and a data storage device 120.

Non-limiting examples of the host 110 include portable electronic devices, such as mobile phones, MP3 players, laptop computers, etc., and electronic devices such as desktop computers, game players, TV, projectors and the like.

The data storage device 120 operates in response to a request from the host 110. The data storage device 120 stores data that are accessed by the host 110. In other words, the data storage device 120 may be used as a main memory unit or a secondary memory unit of the host 110. The data storage device 120 may be realized in in various ways depending on the host interface (or communications) protocol for communication with the host 110. For example, the data storage device 120 may be one among a Solid-State Drive (SSD), a Multi-Media Card (MMC), an embedded MMC (eMMC), a Reduced-Size MMC (RS-MMC), a micro-MMC, a Secure Digital (SD) card, a mini-SD card, a micro-SD card, a Universal Storage Bus (USB) storage device, a Universal Flash Storage (UFS) device, a Compact Flash (CF) card, a smart media card, a memory stick and so forth.

Also, the data storage device 120 includes a memory 150 for storing data that are accessed by the host 110 and a controller 130 for controlling the storing of data into the memory 150.

The memory 150 may retain the stored data even when no power is supplied. Particularly, the memory 150 stores data provided by the host 110 through a write operation, and transmits the stored data to the host 110 through a read operation.

The controller 130 controls the memory 150 in response to a request from the host 110. For example, the controller 130 provides the host 110 with the data that are read from the memory 150, and stores the data inputted from the host 110 in the memory 150. To this end, the controller 130 controls operations of the memory 150 such as a read operation, a program operation, and an erase operation.

The controller 130 includes a processing unit 132, a plurality of storing units which includes a first storing unit 134 and a second storing unit 136, and a buffering unit 138.

The processing unit 132 controls the general operations of the data storage device 120, and controls the write or read operation performed on the memory 150 in response to a write or read request transmitted from the host 110. The processing unit 132 drives firmware called a Flash Transition Layer (FTL) to control the operations of the data storage device 120.

The first and second storing units 134 and 136 store the FTL that is driven by the processing unit 132, and store various data that are used to control the data storage device 120. Particularly the first and second storing units 134 and 136 store data storage information on the data that are stored in the memory 150. For example, when data are written in the memory 150 upon the receipt of a write request transmitted from the host 110, the first storing unit 134 may store Logical to Physical (L2P) information (which is referred to as logical information, hereafter) and the second storing unit 136 may store Physical to Logical (P2L) information (which is referred to as physical information, hereafter), as the data storage information.

Herein, when data having logical page information is written and stored in the memory 150, the logical information may include position information on the position of the data in the memory 150, and the physical information may include the logical page information of the data (e.g., logical page number or logical page index). For example, the position information may include block information on a block including the data or page information on a page of the block (e.g., block/page number or block/page index).

Also, when the controller 130 performs an operation of transmitting data that is read out of the memory 150 to the host 110 and storing data transmitted from the host 110 in the memory 150, the buffering unit 138 temporarily stores data, particularly FTL that is driven by the processing unit 132. Also, the buffering unit 138 temporarily stores various data that are used to control the data storage device 120. For example, the buffering unit 138 temporarily stores data stored in the memory 150, or the logical information or the physical information based on a write request from the host 110.

Hereafter, a data write operation performed in the data storage device in accordance with the embodiment of the present invention is described in detail with reference to FIGS. 2 to 6.

Figure 2:
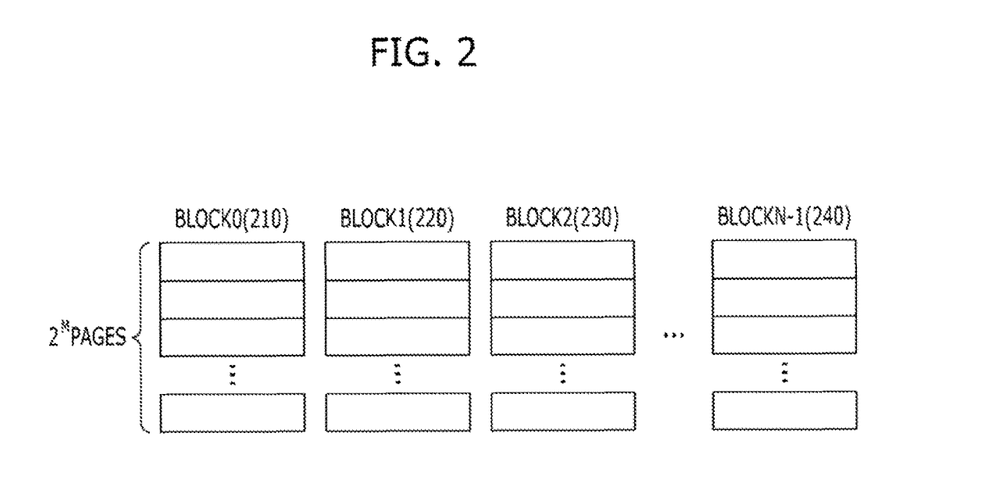
FIG. 2 illustrates an example of a memory in a data storage device in accordance with an embodiment of the present invention.

FIG. 2 illustrates an example of the memory 150 in the data storage device in accordance with the embodiment of the present invention. FIGS. 3 to 6 describe examples of a data write operation in the data storage device in accordance with the embodiment of the present invention.

Referring to FIG. 2, the memory 150 includes a plurality of memory blocks, which includes a first memory block (BLOCK0) 210, a second memory block (BLOCK1) 220, a third memory block (BLOCK2) 230, an Nth memory block (BLOCKN−1) 240. Each of the memory blocks 210, 220, 230 and 240 includes a plurality of pages, for example, $2^M$ pages.

Each of the memory blocks 210, 220, 230 and 240 stores data transmitted from the host 110 through a data write operation, and provides the host 110 with data stored in the memory block through a data read operation. The storing of the data through the data write operation and the transmitting of the data through the data read operation, particularly the operation of storing the data transmitted from the host 110 in the memory blocks 210, 220, 230 and 240 through the data write operation, are performed on a plurality of pages included in each of the memory blocks 210, 220, 230 and 240 on the a page basis.

The data write operation in the data storage device in accordance with the embodiment of the present invention is described in detail with reference to FIGS. 3 to 6. For a simple example, the data storage device includes four memory blocks BLOCK0 to BLOCK3 and each of the memory blocks BLOCK0 to BLOCK3 includes 4 pages. A controller 300 and a memory 350 may correspond to the controller 130 and the memory 150 shown in FIG. 1.

Figure 3:
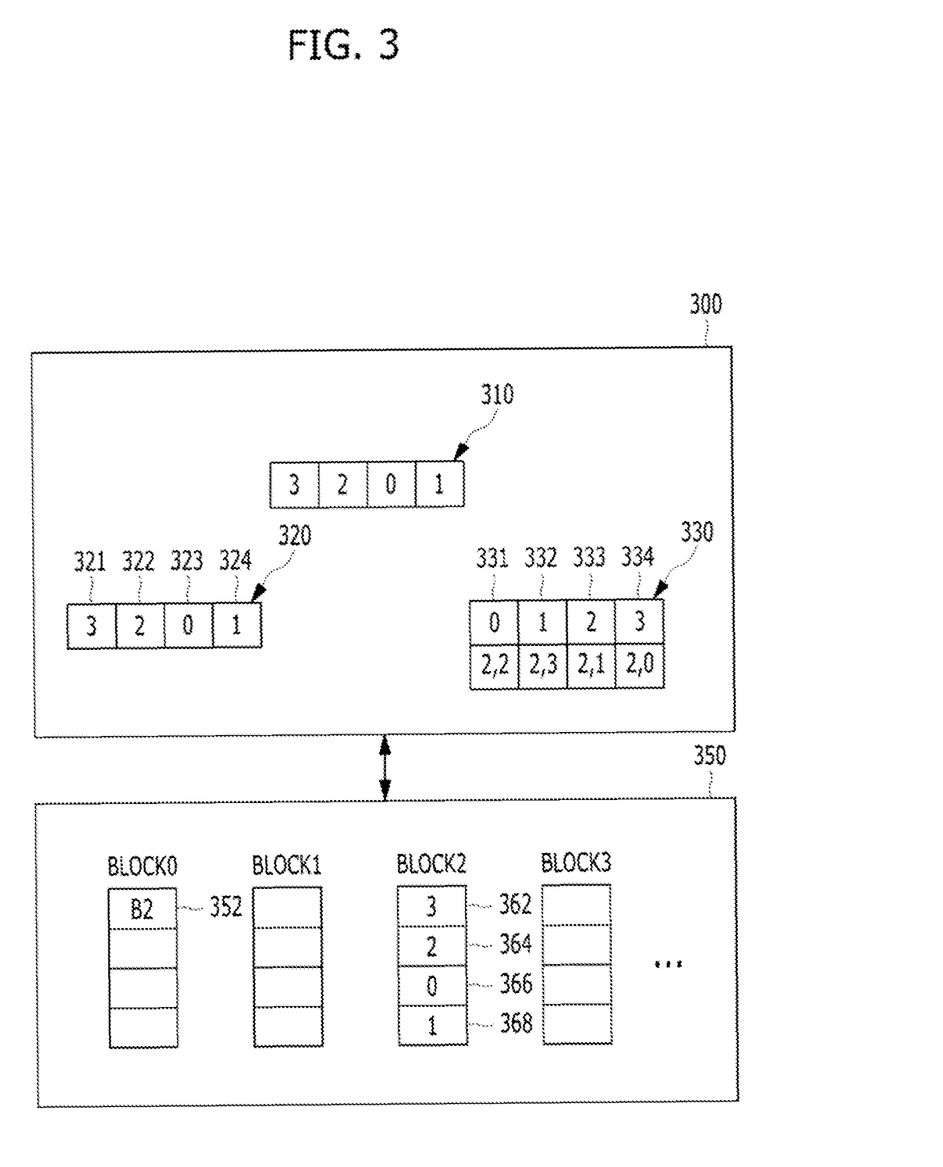
FIGS. 3 to 6 describe examples of a data write operation in a data storage device in accordance with an embodiment of the present invention.

Referring to FIG. 3, when a data 310 to be stored in the memory 350 through a write operation is transmitted from a host, the controller 300 writes the data 310 in the pages of a corresponding memory block BLOCK2 of the memory 350. At this time, the controller 300 may store logical information 330 of data storage information on the data 310 in a first storing unit and store physical information 320 of the data storage information in a second storing unit.

To be specific, when data having logical page information 3 (which is referred to as 'a data 3', hereafter), data having logical page information 2 (which is referred to as 'a data 2', hereafter), data having logical page information 0 (which is referred to as 'a data 0', hereafter), and data having logical page information 1 (which is referred to as 'a data 1', hereafter) are sequentially transmitted from the host at a first moment, the data 310 sequentially including the data 3, the data 2, the data 0 and the data 1 is stored in a buffering unit. In other words, the buffering unit of the controller 300 sequentially stores the data 310 that sequentially includes the data 3, the data 2, the data 0 and the data 1. The data 3, the data 2, the data 0 and the data 1 of the first moment that are stored in the buffering unit are sequentially written and stored in the corresponding memory block of the memory 350. For example, the data 3 of the first moment is stored in a first page 362 of the memory block BLOCK2, and the data 2 of the first moment is stored in a second page 364 of the memory block BLOCK2. The data 0 of the first moment is stored in a third page 366 of the memory block BLOCK2, and the data 1 of the first moment is stored in a fourth page 368 of the memory block BLOCK2. Since all the pages of the memory block BLOCK2 are valid pages, the number of the valid pages of the memory block BLOCK2 is '4'.

As the data 3, the data 2, the data 0 and the data 1 of the first moment are sequentially written and stored in the corresponding pages of the corresponding memory block, the logical information 330 is stored in a first storing unit. The logical information 330 of the first moment includes information 331 representing that the data 0 is stored in the page 366 of the memory block BLOCK2, information 332 representing that the data 1 is stored in the page 368 of the memory block BLOCK2, information 333 representing that the data 2 is stored in the page 364 of the memory block BLOCK2, and information 334 representing that the data 3 is stored in the page 362 of the memory block BLOCK2. For example, in the logical information 330 '0, 1, 2 and 3' of a first row represent information on stored data, which is logical page information of the stored data. Ordered pairs (2,2), (2,3), (2,1) and (2,0) of a second row represent physical position information of the stored data, which represents information on the block and page where the data are stored. For example, in the information 331, '0' of the first row represents the data 0 and the ordered pair (2,2) of the second row represents the third page 336 of the memory block BLOCK2.

Also as the data 3, the data 2, the data 0 and the data 1 of the first moment are sequentially written and stored in the corresponding pages of the corresponding memory block, which are the pages 362, 364, 366 and 368 of the memory block BLOCK2, the physical information 320 is stored in the second storing unit of the controller 300. The physical information 320 of the first moment includes information 321, 322, 323 and 324 representing that the data 3, the data 2, the data 0 and the data 1 are sequentially written and stored in the pages 362, 364, 366 and 368 of the memory block BLOCK2.

The physical information 320 of the first moment that is stored in the second storing unit is written and stored in the corresponding page of a predetermined memory block (e.g., the page 352 of the memory block BLOCK0) among the multiple memory blocks of the memory 350. In other words, the page 352 of the memory block BLOCK0 stores physical information 62 of the memory block BLOCK2, and the physical information 62 of the memory block BLOCK2 includes the information 321, 322, 323 and 324 representing that the data 3, the data 2, the data 0 and the data 1 are sequentially stored in the pages 362 to 368 of the memory block BLOCK2. To sum up, the data 3, the data 2, the data 0 and the data 1 are sequentially written and stored in the pages 362 to 368 of the memory block BLOCK2 in the memory 350, as described above, and the physical information B2 of the memory block BLOCK2 representing the data storage of the memory block BLOCK2 is written and stored in the page 352 of the memory block BLOCK0.

Figure 4:
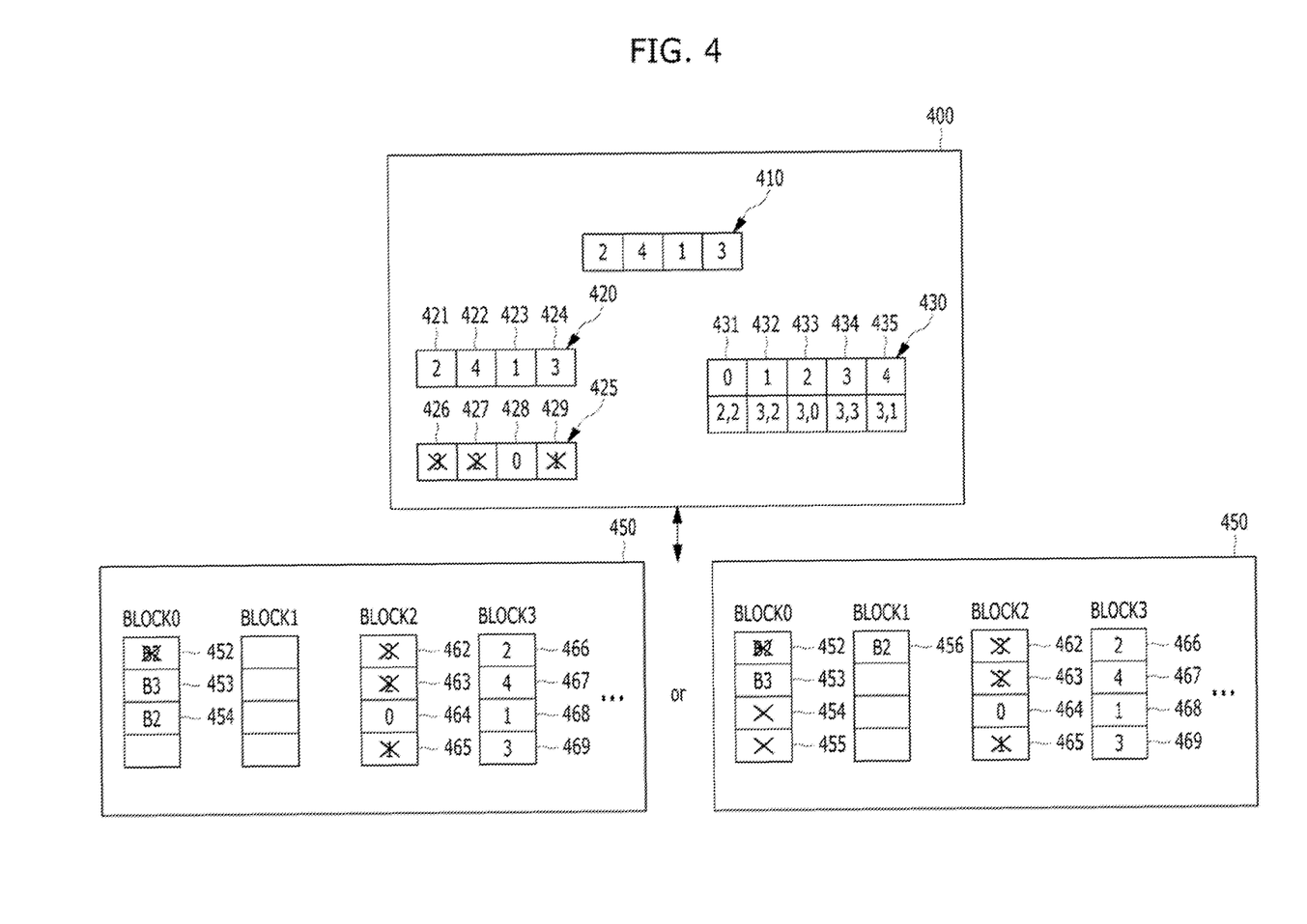

After the data 310 is stored in the memory 350 as described in FIG. 3, data may be further transmitted from a host to be stored in the memory 350. Referring to FIG. 4, a controller 400 and a memory 450 may correspond to the controller 300 and the memory 350 shown in FIG. 3.

When data 410 is transmitted from a host to be stored in the memory 450, which stores other data as described in FIG. 3, the controller 400 writes and stores the data 410 in the corresponding pages of the corresponding memory block BLOCK3 of the memory 450. At this time, the controller 300 may store logical information 430 of data storage information on the data 410 in a first storing unit and store physical information 420 of the data storage information in a second storing unit. The physical information 420 is written and stored in a corresponding page of a predetermined memory block among a plurality of memory blocks of the memory 450.

To be specific, after data 3, data 2, data 0 and data 1 of a first moment are stored in the memory 450 as described earlier with reference to FIG. 3, the data 2, data having logical page information 4 (which is referred to as 'a data 4', hereafter), the data 1, and the data 3 are sequentially transmitted from the host at a second moment. The data 410 sequentially including the data 2, the data 4, the data 1, and the data 3 are stored in a buffering unit. In other words, the buffering unit of the controller 400 sequentially stores the data 2, the data 4, the data 1, and the data 3.

The data 2, the data 4, the data 1, and the data 3 of the second moment that are stored in the buffering unit are sequentially written and stored in a corresponding memory block of the memory 450. For example, the data 2 of the second moment is stored in a first page 466 of the memory block BLOCK3, and the data 4 of the second moment is stored in a second page 467 of the memory block BLOCK3. The data 1 of the second moment is stored in a third page 468 of the memory block BLOCK3, and the data 3 of the second moment is stored in a fourth page 469 of the memory block BLOCK3. Herein, all the pages of the memory block BLOCK3 are valid pages, and the number of valid pages of the memory block. BLOCK3 is '4'.

Also, since the data 2, 4, 1, and 3 of the second moment are sequentially written and stored in the memory 450, the corresponding data stored in the memory 450 at the first moment, which are data 3, 2, and 1 stored in page 462, 463, and 465 of a memory block BLOCK2, become invalid. As a result, the pages 462, 463, and 465 of the memory block BLOCK2 become invalid pages. Herein, a page 464 of the memory block BLOCK2 is a valid page alone. Thus, the number of the valid page of the memory block BLOCK2 is '1'.

As the data 2, the data 4, the data 1, and the data 3 of the second moment are sequentially written and stored in the corresponding pages of the corresponding memory block, the logical information 430 is stored in the first storing unit. Herein the logical information 430 of the second moment includes the logical information 330 of the first moment illustrated in FIG. 3 updated with information 432 representing that the data 1 is stored in the page 468 of the memory block BLOCK3, information 433 representing that the data 2 is stored in the page 466 of the memory block BLOCK3, information 434 representing that the data 3 is stored in the page 469 of the memory block BLOCK3, and information 435 representing that the data 4 is stored in the page 467 of the memory block BLOCK3. In short, since the data 3 stored in the page 462 of the memory block BLOCK2, the data 2 stored in the page 463 of the memory block BLOCK2, and the data 1 stored in the page 465 of the memory block BLOCK2 become invalid, the logical information 430 of the second moment includes information 431 representing that data 0 is stored in the page 464 of the memory block BLOCK2, the information 432 representing that the data 1 is stored in the page 468 of the memory block BLOCK3, the information 433 representing that the data 2 is stored in the page 466 of the memory block BLOCK3, the information 434 representing that the data 3 is stored in the page 469 of the memory block BLOCK3, and the information 435 representing that the data 4 is stored in the page 467 of the memory block BLOCK3. For example, '0, 1, 2, 3 and 4' of a first row in the logical information 430 are information on stored data, in other words, logical page information of the stored data. The ordered pairs of a second row are physical position information of the stored data, in other words, information on the corresponding memory block and pages where the data are stored.

Also, since the data 2, the data 4, the data 1, and the data 3 of the second moment are sequentially written and stored in the corresponding pages of the corresponding memory block, in other words, which are the pages 466, 467, 468 and 469 of the memory block BLOCK3, physical information 420 is stored in the second storing unit of the controller 400. The physical information 420 of the second moment includes the information 421, 422, 423 and 424 representing that the data 2, the data 4, the data 1, and the data 3 are sequentially written and stored in the pages 466, 467, 468 and 469 of the memory block BLOCK3.

The physical information 420 of the second moment that is stored in the second storing unit is written and stored as physical information B3 of the memory block BLOCK3 in the corresponding page of a predetermined memory block (e.g., a page 453 of the memory block BLOCK0) among the multiple memory blocks of the memory 450. In other words, the page 453 of the memory block BLOCK0 stores physical information B3 of the memory block BLOCK3, and the physical information B3 of the memory block BLOCK3 includes the information 421, 422, 423 and 424 representing that the data 2, the data 4, the data 1 and the data 3 are sequentially stored in the pages 466 to 469 of the memory block BLOCK3.

Also, as described above, since the data 2 the data 4 the data 1, and the data 3 of the second moment are stored, the data 3 stored in the page 462 of the memory block BLOCK2, the data 2 stored in the page 463 of the memory block BLOCK2, and the data 1 stored in the page 465 of the memory block BLOCK2 are invalid and the page 462 of the memory block BLOCK2, the page 463 of the memory block BLOCK2, and the page 465 of the memory block BLOCK2 become invalid pages. Thus, in physical information 425 of the memory block BLOCK2 representing that the data 3, the data 2, the data 0 and the data 1 are sequentially written in the pages 462 to 465 of the memory block BLOCK2, information representing the invalid pages of the memory block BLOCK2 becomes invalid information. In other words, information 426 corresponding to the page 462 of the memory block BLOCK2, information 427 corresponding to the page 463 of the memory block BLOCK2, and information 429 corresponding to the page 465 of the memory block BLOCK2 becomes invalid information.

The physical information 425 of the second moment is stored as the physical information 32 of the memory block BLOCK2 in the corresponding pages of a predetermined memory block among the multiple memory blocks of the memory 450. The information stored in the memory 450 as the physical information B2 of the memory block BLOCK2 of the first moment becomes invalid information. As a result, a page 452 of the memory block BLOCK0 where the physical information B2 of the memory block 2 BLOCK2 of the first moment is stored becomes an invalid page in the memory 450.

Since the second moment comes next to the first moment, the physical information 425 of the second moment is written and stored as the physical information B2 of the memory block BLOCK2 in a page 454 of the memory block BLOCK0 among the multiple memory blocks of the memory 450. Therefore, the page 453 of the memory block BLOCK0 stores the physical information B3 of the memory block BLOCK3, and the physical information B3 of the memory block BLOCK3 includes the information 421, 422, 423 and 424 representing that the data 2, the data 4, the data 1, and the data 3 are sequentially stored in the pages 466 to 469 of the memory block BLOCK3. The page 454 of the memory block BLOCK0 stores the physical information B2 of the memory block BLOCK2, and the physical information B2 of the memory block BLOCK2 includes information 428 representing that the data 0 is stored in the page 464 of the memory block BLOCK2.

When the number of valid pages of the memory block BLOCK0, or a change in the number of the valid pages (or the number of the occurring invalid pages), is checked out the number of valid pages may be equal to or less than a predetermined first threshold value, or the change in the number of the valid pages may be equal to or greater than a predetermined second threshold value. For example, as described in the bottom right-side of FIG. 1, when pages 454 and 455 of the memory block BLOCK0 are invalid pages, a page 452 of the memory block BLOCK0 where the physical information B2 of the memory block 2 BLOCK2 of the first moment is stored may also be treated as an invalid page through a data update performed at the second moment. In this case, the physical information 425 of the second moment is written and stored as the physical information B2 of the memory block BLOCK2 in a page 456 of a memory block BLOCK1 among a plurality of memory blocks of a memory 450. As a result, the physical information B2 of the memory block BLOCK2 is written and stored in the page 456 of the memory block BLOCK1 among the multiple memory blocks of the memory 450. To sum up, a page 453 of the memory block BLOCK0 stores the physical information B3 of the memory block BLOCK3, and the physical information B3 of the memory block BLOCK3 includes the information 421, 422, 423 and 424 representing that the data 2, the data 4, the data 1, and the data 3 are sequentially stored in the pages 466 to 469 of the memory block 3 BLOCK3. The page 456 of the memory block BLOCK1 stores the physical information B2 of the memory block BLOCK2. The physical information B2 of the memory block BLOCK2 includes the information 428 representing that the data 0 is stored in the page 464 of the memory block BLOCK2.

Figure 5:
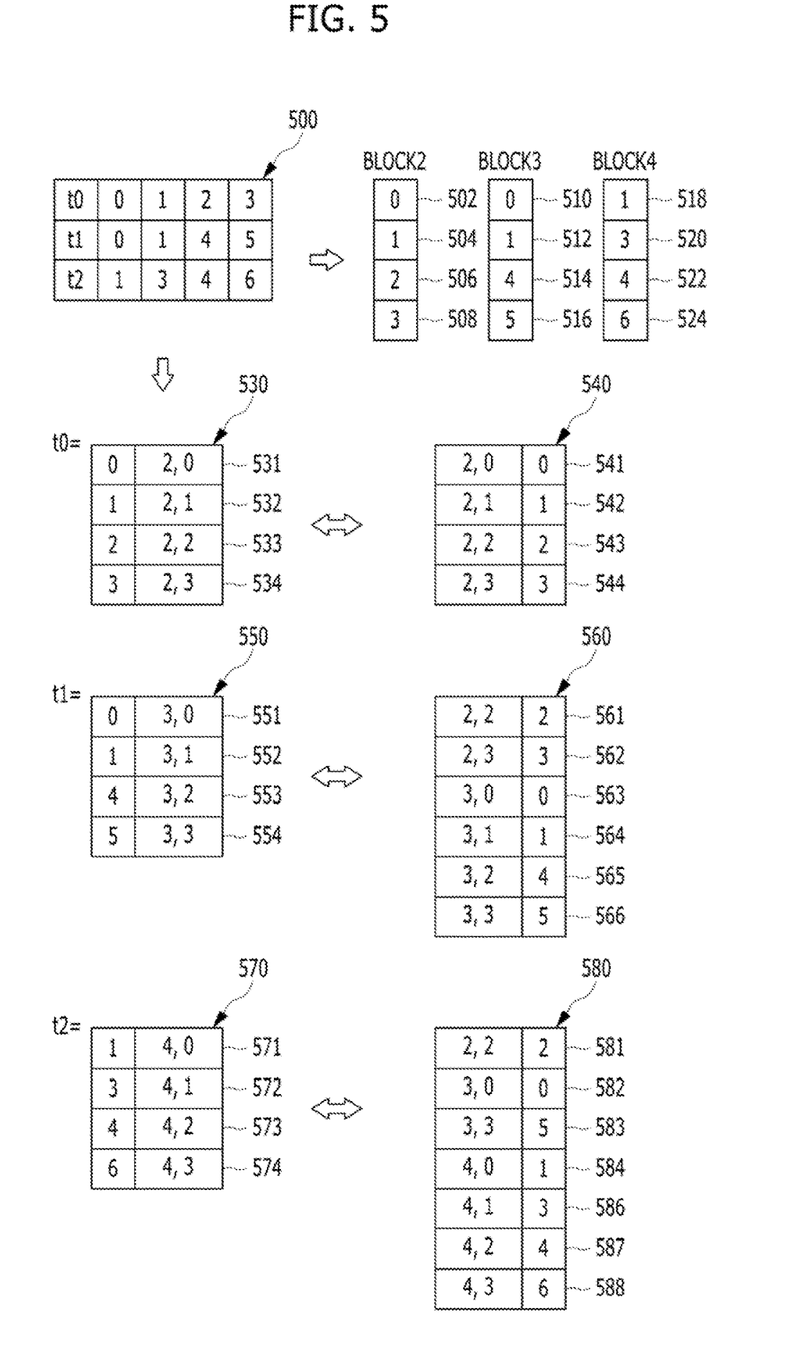

Subsequently, referring to FIG. 5, while data 500 to be written and stored in a memory through a data write operation is transmitted from a host, a controller writes and stores the data 500 in the corresponding pages of the corresponding memory blocks BLOCK2, BLOCK3 and BLOCK4 of the memory. At this time, the controller may store logical information 530, 550, and 570 of data storage information on the data 510 in a first storing unit and store physical information 540, 560, and 580 of the data storage information in a second storing unit.

To be specific, while data 0, data 1, data 2 and data 3 are transmitted from the host at a particular moment, e.g., a moment t0, the data 0, the data 1, the data 2 and the data 3 are stored in a buffering unit. In other words, the buffering unit stores the data 0, the data 1, the data 2 and the data 3 of the moment t0 (refer to '0, 1, 2 and 3' of the moment t0 in the data 500 shown in FIG. 5).

The data 0, the data 1, the data 2 and the data 3 of the moment t0 that are stored in the buffering unit are sequentially written and stored in the corresponding pages of a corresponding memory block. For example, the data 0 of the moment t0 is stored in a page 502 of the memory block BLOCK2, and the data 1 of the moment t0 is stored in a page 504 of the memory block BLOCK2. The data 2 of the moment t0 is stored in a page 506 of the memory block BLOCK2, and the data 3 of the moment t0 is stored in a page 508 of the memory block BLOCK2. Since all the pages of the memory block BLOCK2 are valid pages, the number of valid pages of the memory block 2 BLOCK2 is '4'.

As the data 0, the data 1, the data 2 and the data 3 of the moment t0 are written and stored in the corresponding pages of the corresponding memory block, the logical information 530 is stored in the first storing unit. The logical information 530 of the moment t0 includes information 531 representing that the data 0 is stored in the page 502 of the memory block BLOCK2, information 532 representing that the data 1 is stored in the page 504 of the memory block BLOCK2, information 533 representing that the data 2 is stored in the page 505 of the memory block BLOCK2, and information 534 representing that the data 3 is stored in the page 508 of the memory block BLOCK2. For example, '0, 1, 2, 3 and 4' of a first column in the logical information 530 are information on stored data, in other words, logical page information of the stored data. The ordered pairs (2,0), (2,1), (2,2) and (2,3) of a second column are physical position information of the stored data, in other words, information on the corresponding memory block and pages where the data are stored. For example, in the logical information 530, '0' of the first column of the first row 531 is the data 0, and it represents a logical page 0, and the ordered pair (2,0) of the second column of the first row 531 represents the page 502 of the memory block BLOCK2.

Also, since the data 0 the data 1, the data 2 and the data 3 of the moment t0 are written and stored in the corresponding pages of the corresponding memory block, physical information 540 is stored in the second storing unit. The physical information 540 of the moment t0 includes information 541 representing that the data 0 is stored in the page 502 of the memory block BLOCK2, information 542 representing that the data 1 is stored in the page 504 of the memory block BLOCK2, information 543 representing that the data 2 is stored in the page 506 of the memory block BLOCK2, and information 544 representing that the data 3 is stored in the page 508 of the memory block BLOCK2. For example, the ordered pairs (2,0), (2,1), (2,2) and (2,3) of the first column of the physical information 540 represents physical position information of the stored data. In other words, the ordered pairs (2,0), (2,1), (2,2) and (2,3) of the first column of the physical information 540 represents information on the corresponding memory block and pages where the data are stored. The '0, 1, 2, 3 and 4' of the second column represent information on the stored data, i.e., logical page information of the stored data. For example, the ordered pair (2,0) of the first column of the first row 541 in the physical information 540 represents the page 502 of the memory block BLOCK2, and '0' of the second column of the first rout 541 means data 0 and represents a logic page 0.

Also, as described earlier with reference to FIGS. 3 and 4, the physical information 540 of the moment t0 stored in the second storing unit is stored in the corresponding page (not shown in FIG. 5) of a predetermined memory block among the multiple memory blocks of the memory.

When data 0, data 1, data 4, and data including logical page information 5 (which is referred to as a 'data 5', hereafter) are transmitted from the host at a particular moment, e.g., a moment t1 coming next to the moment t0, the data 0, the data 1, the data 4, and the data 5 are stored in the buffering unit. In other words, the buffering unit stores the data 0, the data 1, the data 4, and the data 5 of the moment t1 (which are '0, 1, 4 and 5' of the moment t1 in the data 500 of FIG. 5).

Since the data 0, the data 1, the data 2 and the data 3 of the moment t0 and the data 0, the data 1, the data 4, and the data 5 of the moment t1 are stored in the buffering unit, the data 0 and the data 1 of the moment t0 are updated into the data 0 and the data 1 of the moment t1.

Also, the data 0, the data 1, the data 4, and the data 5 of the moment t1 are written and stored in the corresponding pages of the corresponding memory block. For example, the data 0 of the moment t1 is stored in a page 510 of the memory block BLOCK3, and the data 1 of the moment t1 is stored in a page 512 of the memory block BLOCK3. The data 4 of the moment t1 is stored in a page 514 of the memory block BLOCK3, and the data 5 of the moment t1 is stored in a page 516 of the memory block BLOCK3.

As described above, since the data 0 of the moment t1 is stored in the page 510 of the memory block BLOCK3 and the data 1 of the moment t1 is stored in the page 512 of the memory block BLOCK3, the data 0 and the data 1 of the moment t0 are updated into the data 0 and the data 1 of the moment t1. As a result, the page 502 of the memory block BLOCK2 where the data 0 of the moment t0 is stored and the page 504 of the memory block BLOCK2 where the data 1 of the moment t0 is stored become invalid pages. In other words, the valid pages are the page 506 of the memory block BLOCK2 where the data 2 is stored and the page 508 of the memory block BLOCK2 where the data 3 is stored. Herein, the number of the valid pages of the memory block BLOCK2 is '2', and since all the pages of the memory block BLOCK3 are valid pages, the number of the valid pages of the memory block BLOCK3 is '4'.

Since the data 0, the data 1, the data 4, and the data 5 of the moment t1 are written and stored in the corresponding pages of the corresponding memory block, logical information 550 is stored in a first storing unit. The logical information 550 of the moment t1 includes information 551 representing that the data 0 is stored in the page 510 of the memory block BLOCK3 information 552 representing that the data 1 is stored in the page 512 of the memory block BLOCK3, information 553 representing that the data 4 is stored in the page 514 of the memory block. BLOCK3, and information 554 representing that the data 5 is stored in the page 516 of the memory block BLOCK3. For example, the first column of the logical information 550 represents information on stored data, which is logical page information of the stored data, and the ordered pair of the second column represents physical position information of the stored data, which is information on the memory block and page where the data are stored.

Also, as the data 0, the data 1, the data 4, and the data 5 of the moment t1 are written and stored in the corresponding pages of the corresponding memory block physical information 560 is stored in the second storing unit. Particularly, as described above, since the data 0 of the moment t1 is stored in the page 510 of the memory block BLOCK3 and the data 1 of the moment t1 is stored in the page 512 of the memory block BLOCK3, to make the page 502 of the memory block BLOCK2 where the data 0 of the moment t0 is stored and the page 504 of the memory block BLOCK2 where the data 1 of the moment t0 is stored be invalid pages, the information 541 representing that the data 0 is stored in the page 502 of the memory block BLOCK2 and the information 542 representing that the data 1 is stored in the page 504 of the memory block BLOCK2 become invalid information. In other words, the information 541 and 542 in the physical information 540 of the moment t0 are updated to information 563 representing that the data 0 is stored in the page 510 of the memory block BLOCK3 and information 564 representing that the data 1 is stored in the page 512 of the memory block BLOCK3 in physical information 560 of the moment t1.

In short, the physical information 560 of the moment t1 includes information 561 representing that the data 2 is stored in the page 506 of the memory block BLOCK2, information 562 representing that the data 3 is stored in the page 508 of the memory block BLOCK2 information 563 representing that the data 0 is stored in the page 510 of the memory block BLOCK3, information 564 representing that the data 1 is stored in the page 512 of the memory block BLOCK3, information 565 representing that the data 4 is stored in the page 514 of the memory block BLOCK3, and information 566 representing that the data 5 is stored in the page 516 of the memory block BLOCK3. For example, the ordered pair of the first column of the physical information 560 represents physical position information of the stored data, which is information on the corresponding memory block and page where the data are stored, and the second column represents information on the stored data, which is logical page information of the stored data.

As described earlier with reference to FIGS. 3 and 4, the physical information 560 of the moment t1 that is stored in the second storing unit is stored in the corresponding page (not shown in FIG. 5) of a predetermined memory block among the multiple memory blocks of the memory.

Also, when data 1, data 3, data 4, and data including logical page information 6 (which is referred to as a 'data 6', hereafter) are transmitted from the host at the next moment, e.g., a moment t2 coming next to the moment t1, the data 1, the data 3, the data 4, and the data 6 are stored in the buffering unit. In other words, the buffering unit stores the data 1, the data 3, the data 4, and the data 6 of the moment t2 (which are '1, 3, 4 and 6' of the moment t2 in the data 500 of FIG. 5).

Herein, since the data 0, the data 1 the data 2 and the data 3 of the moment t0, the data 0, the data 1, the data 4, and the data 5 of the moment t1, and the data 1, the data 3, the data 4, and the data 6 of the moment t2 are stored in the buffering unit, the data 3 of the moment t0 and the data 1 and the data 4 of the moment t1 are updated into the data 1, the data 3 and the data 4 of the moment t2.

Also, the data 1, the data 3, the data 4, and the data 6 of the moment t2 are written and stored in the corresponding pages of the corresponding memory block. For example, the data 1 of the moment t2 is stored in a page 518 of the memory block BLOCK4, and the data 3 of the moment t2 is stored in a page 520 of the memory block BLOCK4. The data 4 of the moment t2 is stored in a page 522 of the memory block BLOCK4, and the data 6 of the moment t2 is stored in a page 524 of the memory block BLOCK4.

As described above, since the data 1 of the moment t2 is stored in the page 518 of the memory block BLOCK4 and the data 3 of the moment t2 is stored in the page 520 of the memory block BLOCK4 and the data 4 of the moment t2 is stored in the page 522 of the memory block BLOCK4, the data 3 of the moment t0 and the data 1 and the data 4 of the moment t1 are updated into the data 1, the data 3 and the data 4 of the moment t2. As a result, the page 508 of the memory block BLOCK2 where the data 3 of the moment t0 is stored, the page 512 of the memory block BLOCK3 where the data 1 of the moment t1 is stored, and the page 514 of the memory block BLOCK3 where the data 4 of the moment t1 is stored become invalid pages. In other words, the valid pages are the page 506 of the memory block BLOCK2 where the data 2 is stored, the page 510 of the memory block BLOCK3 where the data 0 is stored, and the page 516 of the memory block BLOCK3 where the data 5 is stored. Herein, the number of the valid pages of the memory block BLOCK2 is '1', and the number of the valid pages of the memory block BLOCK3 is '2'. Since all the pages of the memory block BLOCK4 are valid pages, the number of valid pages of the memory block BLOCK4 is '4'.

Since the data 1, the data 3, the data 4, and the data 6 of the moment t2 are written and stored in the corresponding pages of the corresponding memory block, logical information 570 is stored in a first storing unit. The logical information 570 of the moment t2 includes information 571 representing that the data 1 is stored in the page 518 of the memory block BLOCK4, information 572 representing that the data 3 is stored in the page 520 of the memory block BLOCK4, information 573 representing that the data 4 is stored in the page 522 of the memory block BLOCK4, and information 574 representing that the data 6 is stored in the page 524 of the memory block BLOCK4. For example, the first column of the logical information 570 represents information on stored data, which is logical page information of the stored data, and the ordered pair of the second column represents physical position information of the stored data, which is information on the memory block and page where the data are stored.

Also, as the data 1, the data 3, the data 4, and the data 6 of the moment t2 are written and stored in the corresponding pages of the corresponding memory block, physical information 580 is stored in the second storing unit. Particularly, as described above, since the data 1 of the moment t2 is stored in the page 518 of the memory block BLOCK4 and the data 3 of the moment t2 is stored in the page 520 of the memory block BLOCK4 and data 4 of the moment t2 is stored in the page 522 of the memory block BLOCK4, to make the page 508 of the memory block BLOCK2 where the data 3 of the moment t0 is stored the page 512 of the memory block BLOCK3 where the data 1 of the moment t1 is stored and the page 514 of the memory block BLOCK3 where the data 4 of the moment t1 is stored be invalid pages, the information 562 representing that the data 3 is stored in the page 508 of the memory block BLOCK2, the information 564 representing that the data 1 is stored in the page 512 of the memory block. BLOCK3 and the information 565 representing that the data 4 is stored in the page 514 of the memory block BLOCK3 become invalid information in the physical information 560 of the moment t1. In other words, the information 562, 564, and 565 in the physical information 560 of the moment t1 are updated into information 586 representing that the data 3 is stored in the page 520 of the memory block BLOCK4, information 584 representing that the data 1 is stored in the page 518 of the memory block BLOCK4, and information 587 representing that the data 4 is stored in the page 522 of the memory block BLOCK4 of physical information 580 of the moment t2.

In short, the physical information 580 of the moment t2 includes information 581 representing that the data 2 is stored in the page 506 of the memory block BLOCK2, information 582 representing that the data 0 is stored in the page 510 of the memory block BLOCK3 information 583 representing that the data 5 is stored in the page 516 of the memory block BLOCK3, information 584 representing that the data 1 is stored in the page 518 of the memory block BLOCK4, information 586 representing that the data 3 is stored in the page 520 of the memory block BLOCK4, information 587 representing that the data 4 is stored in the page 522 of the memory block BLOCK4, and information 588 representing that the data 6 is stored in the page 524 of the memory block BLOCK4. For example, the ordered pair of the first column of the physical information 580 represents physical position information of the stored data, which is information on the corresponding memory block and page where the data are stored, and the second column represents information on the stored data, which is logical page information of the stored data.

As described earlier with reference to FIGS. 3 and 4, the physical information 580 of the moment t2 that is stored in the second storing unit is stored in the corresponding page (not shown in FIG. 5) of a predetermined memory block among the multiple memory blocks of the memory.

As described above with reference to FIG. 5, the data storage device in accordance with the embodiment of the present invention updates the data storage information on the data stored in the memory, and particularly updates physical information on an invalid page to efficiently store the physical information when data having the same logical page as a stored data is stored in the memory. Therefore, the data storage device in accordance with the embodiment of the present invention may efficiently check out invalid pages by easily checking the physical information and the logical information.

Figure 6:
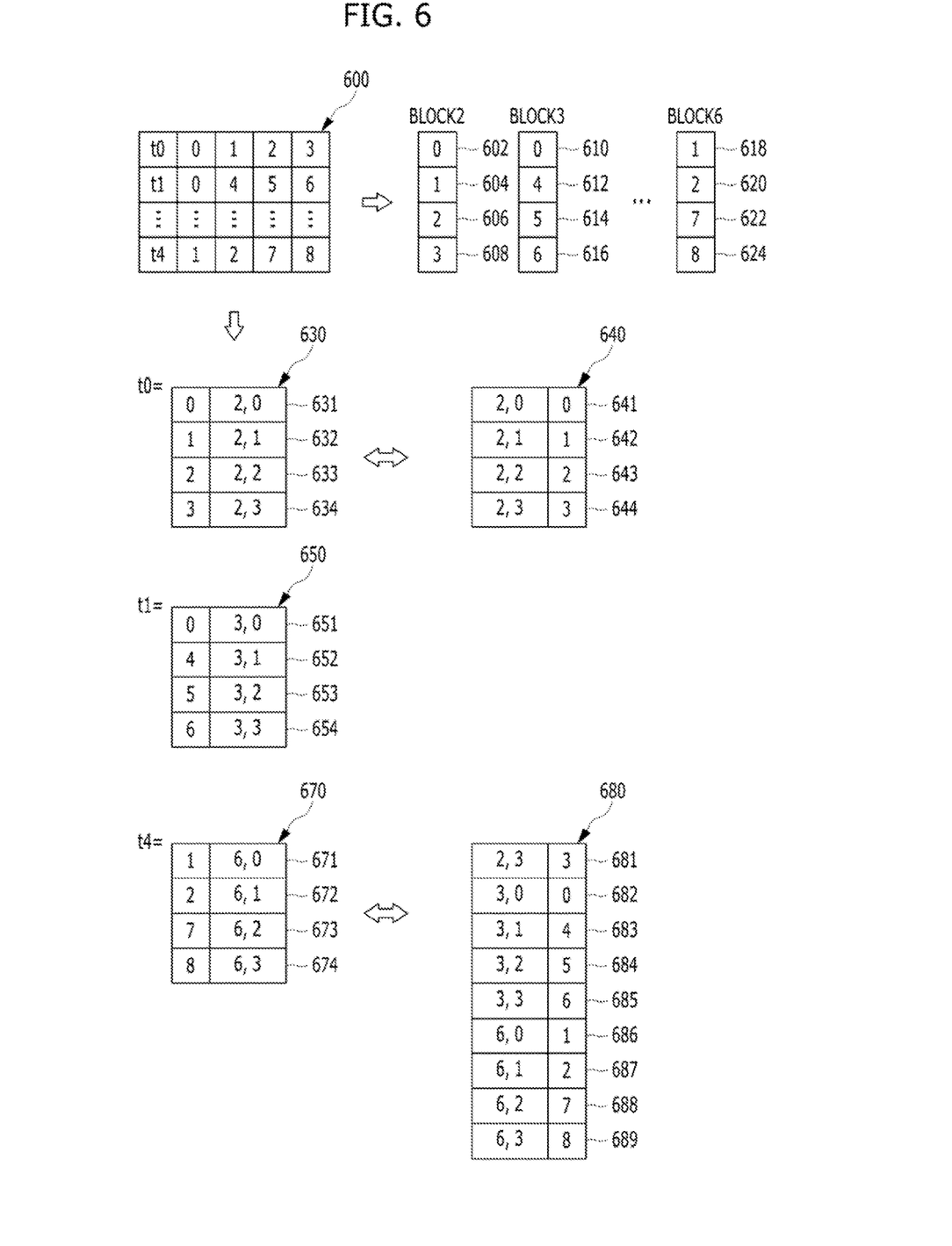

Subsequently, referring to FIG. 6, while data 600 is transmitted from a host and written and stored in a memory through a data write operation, a controller writes and stores the data 600 in the corresponding pages of the corresponding memory blocks BLOCK2, BLOCK3 and BLOCK6 of the memory. At this time, the controller may store logical information 630, 650, and 670 of data storage information on the data 610 in a first storing unit and store physical information 640, and 680 of the data storage information in a second storing unit.

To be specific, while data 0, data 1, data 2 and data 3 are transmitted from the host at a moment t0, the data 0, the data 1, the data 2 and the data 3 are stored in a buffering unit. In other words, the buffering unit stores the data 0, the data 1, the data 2 and the data 3 of the moment t0 (refer to '0, 1, 2 and 3' the moment t0 in the data 600 shown in FIG. 6).

The data 0, the data 1, the data 2 and the data 3 of the moment t0 that are stored in the buffering unit are sequentially written and stored in the corresponding pages of a corresponding memory block. For example, the data 0 of the moment t0 is stored in a page 602 of the memory block BLOCK2, and the data 1 of the moment t0 is stored in a page 604 of the memory block BLOCK2. The data 2 of the moment t0 is stored in a page 606 of the memory block BLOCK2, and the data 3 of the moment t0 is stored in a page 608 of the memory block BLOCK2. Since all the pages of the memory block BLOCK2 are valid pages, the number of valid pages of the memory block BLOCK2 is '4'.

As the data 0, the data 1, the data 2 and the data 3 of the moment t0 are written and stored in the corresponding pages of the corresponding memory block, the logical information 630 is stored in the first storing unit. The logical information 630 of the moment t0 includes information 631 representing that the data 0 is stored in the page 602 of the memory block BLOCK2 information 632 representing that the data 1 is stored in the page 604 of the memory block BLOCK2, information 633 representing that the data 2 is stored in the page 606 of the memory block BLOCK2, and information 634 representing that the data 3 is stored in the page 608 of the memory block BLOCK2 For example, in the logical information 630, the first column represents a logical page information of the stored data, and the second column represents physical position information of the stored data, which is information on the corresponding memory block and page where the data is stored.

Also, since the data 0, the data 1, the data 2 and the data 3 of the moment t0 are written and stored in the corresponding pages of the corresponding memory block, physical information 640 is stored in the second storing unit. The physical information 640 of the moment t0 includes information 641 representing that the data 0 is stored in the page 602 of the memory block BLOCK2, information 642 representing that the data 1 is stored in the page 604 of the memory block BLOCK2, information 643 representing that the data 2 is stored in the page 606 of the memory block BLOCK2, and information 644 representing that the data 3 is stored in the page 608 of the memory block BLOCK2. For example, in the physical information 640, the first column represents the physical position information of the stored data, which is information on the corresponding memory block and page where the data is stored, and the second column represents logical page information of the stored data.

Also, as described earlier with reference to FIGS. 3 and 4, the physical information 640 of the moment t0 stored in the second storing unit is stored in the corresponding page (not shown in FIG. 6) of a predetermined memory block among the multiple memory blocks of the memory.

When data 0, data 4 data 5, and data 6 are transmitted from the host at a particular moment, e.g., a moment t1 coming next to the moment t0, the data 0, the data 4, the data 5, and the data 6 are stored in the buffering unit. In other words, the buffering unit stores the data 0, the data 4, the data 5, and the data 6 of the moment t1 (which are '0, 4, 5 and 6' of the moment t1 in the data 600 of FIG. 6).

Since the data 0, the data 1, the data 2 and the data 3 of the moment t0 and the data 0, the data 4, the data 5, and the data 6 of the moment t1 are stored in the buffering unit, the data 0 of the moment t0 is updated into the data 0 of the moment t1.

Also, the data 0, the data 4, the data 5, and the data 6 of the moment t1 are written and stored in the corresponding pages of the corresponding memory block. For example, the data 0 of the moment t1 is stored in a page 610 of the memory block BLOCK3, and the data 4 of the moment t1 is stored in a page 612 of the memory block BLOCK3. The data 5 of the moment t1 is stored in a page 614 of the memory block BLOCK3, and the data 6 of the moment t1 is stored in a page 616 of the memory block BLOCK3.

As described above, since the data 0 of the moment t1 is stored in the page 610 of the memory block BLOCK3 the data 0 of the moment t0 is updated into the data 0 of the moment t1. As a result, the page 602 of the memory block BLOCK2 where the data 0 of the moment t0 is stored becomes an invalid page. In other words, the valid pages of the memory block BLOCK2 are the page 604 where the data 1 is stored, the page 606 where the data 2 is stored, and the page 608 where the data 3 is stored. Herein, the number of the valid pages of the memory block BLOCK2 is '3' and since all the pages of the memory block BLOCK3 are valid pages the number of the valid pages of the memory block BLOCK3 is '4'.

Since the data 0, the data 4, the data 5, and the data 6 of the moment t1 are written and stored in the corresponding pages of the corresponding memory block, logical information 650 is stored in a first storing unit. The logical information 650 of the moment t1 includes information 651 representing that the data 0 is stored in the page 610 of the memory block BLOCK3, information 652 representing that the data 4 is stored in the page 612 of the memory block BLOCK3, information 653 representing that the data 5 is stored in the page 614 of the memory block BLOCK3, and information 654 representing that the data 6 is stored in the page 616 of the memory block BLOCK3. For example, the first column of the logical information 650 represents information on stored data, which is logical page information of the stored data, and the ordered pair of the second column represents physical position information of the stored data, which is information on the memory block and page where the data are stored.

A data storage device in accordance with an embodiment of the present invention checks out the number of valid pages or the change in the number of valid pages (or the number of the occurring invalid pages). When the number of the valid pages is equal to or less than a predetermined first threshold value, or the change in the number of the valid pages is equal to or greater than a predetermined second threshold value, the physical information is updated and stored since the data are written and stored in the corresponding pages of a corresponding memory block at a particular moment.

In other words, when the data of a first group are written in the corresponding pages of a corresponding memory block at a first moment and then the data of the first group are updated at a second moment, the number of the valid pages or the change in the number of the valid pages (or the number of the occurring ineffective pages) among the pages of a first group where the data of the first group are stored is checked out. When the number of the valid pages among the pages of the first group is equal to or less than the predetermined first threshold value, or the change in the number of the valid pages is equal to or greater than the predetermined second threshold value, the physical information is updated and stored since the data are written and stored in the corresponding pages of a corresponding memory block at the second moment.

Hereafter, for a simple description, the predetermined first threshold value is described as '1' and the predetermined second threshold value is described as '2'. The predetermined threshold values may be set variably depending on the usage environment of the data storage device in accordance with the embodiment of the present invention.

To be specific, while data 1, data 2, data having a logical page information 7 (which is referred to as 'a data 7', hereafter), and data having a logical page information 8 (which is referred to as 'a data 8', hereafter) are transmitted from the host at a second moment, e.g., moment t4, which is any moment coming after a first moment, e.g., moment t0, the data 1, the data 2, the data 7 and the data 8 are stored in a buffering unit. In other words, the buffering unit stores the data 1, the data 2, the data 7 and the data 8 of the moment t4 (refer to '1, 2, 7 and 8' of the moment t4 in the data 600 shown in FIG. 6).

The data 0, the data 1, the data 2 and the data 3 of the moment t0, the data 0, the data 4, the data 5 and the data 6 of the moment t1, and the data 1, the data 2, the data 7 and the data 8 of the moment t4 are stored in the buffering unit, and the data 1 and the data 2 of the moment t0 are updated into the data 1 and the data 2 of the moment t4.

The data 1, the data 2, the data 7 and the data 8 of the moment t4 that are stored in the buffering unit are written and stored in the corresponding pages of a corresponding memory block. For example, the data 1 of the moment t4 is stored in a page 618 of a memory block BLOCK6, and the data 2 of the moment t4 is stored in a page 620 of the memory block BLOCK6. The data 7 of the moment t4 is stored in a page 622 of the memory block BLOCK6, and the data 8 of the moment t4 is stored in a page 624 of the memory block BLOCK6.

As described above, the data 0, the data 1, the data 2 and the data 3 of the moment t0 stored in the buffering unit become the data of the first group of the first moment. The data of the first group of the first moment are written and stored in the corresponding pages of a corresponding memory block. In other words, the data 0 of the moment t0 is stored in the page 602 of the memory block BLOCK2 and the data 1 of the moment t0 is stored in the page 604 of the memory block BLOCK2 and the data 2 of the moment t0 is stored in the page 606 of the memory block BLOCK2 and the data 3 of the moment t0 is stored in the page 608 of the memory block BLOCK2. Therefore, the pages 602 to 608 of the memory block BLOCK2 become the pages of the first group. The number of the valid pages in the pages of the first group is '4'.

Also, as described above, the data 0, the data 1, the data 2 and the data 3 of the moment t0 stored in the buffering unit become the data of the second group of the second moment. The data of the second group of the second moment are written and stored in the corresponding pages of a corresponding memory block. In other words, the data 1 of the moment t4 is stored in the page 618 of the memory block BLOCK6 and the data 2 of the moment t4 is stored in the page 620 of the memory block BLOCK6 and the data 7 of the moment t4 is stored in the page 622 of the memory block BLOCK6 and the data 8 of the moment t4 is stored in the page 624 of the memory block BLOCK6. Therefore, the pages 618 to 624 of the memory block BLOCK6 become the pages of the second group. The number of valid pages in the pages of the second group is '4'.

Since the data 1 of the moment t4, which is the second moment, is stored in the page 618 of the memory block BLOCK6 and the data 2 of the moment t4 is stored in the page 620 of the memory block BLOCK6, the data 1 the data 2 of the moment t0 are updated into the data 1 and the data 2 of the moment t4. As a result, the page 604 of the memory block BLOCK2 where the data 1 of the moment t0 is stored and the page 606 of the memory block BLOCK2 where the data 2 of the moment t0 is stored become invalid pages. In other words, the page 608 of the memory block BLOCK2 where the data 3 is stored becomes the only valid page. In short, the number of the valid page among the pages of the first group is '1'. Since the number of the valid pages among the pages of the first group is '4' at the moment t0, '3' at the moment t1, and '1' at the moment t4, the number of the valid pages is equal to or less than the predetermined first threshold value, or the change in the number of the valid pages is equal to or greater than the predetermined second threshold value, at the moment t4. The physical information is updated and stored at the moment t4.

The data storage device in accordance with the embodiment of the present invention updates the physical information 640 of the moment t0 as the first moment, and updates the physical information 680 of the moment t4 as the second moment. Therefore, the update operation is performed by reflecting that the data from the first moment to the second moment, which is from the moment t0 to the moment t4, are written and stored in the corresponding pages of a corresponding memory block.

In other words, the physical information 680 is stored in the second storing unit by reflecting the fact that the data 1, the data 2, the data 7 and the data 8 of the moment t4 are written and stored in the corresponding pages of the corresponding memory block after the data 0, the data 4, the data 5 and the data 6 of the moment t1 are written and stored in the corresponding pages of the corresponding memory block. In particular, as described above, since the data 0 is stored in the page 602 of the memory block BLOCK2 and the data 1 is stored in the page 604 of the memory block BLOCK2 and the data 2 is stored in the page 606 of the memory block BLOCK2 and the data 3 is stored in the page 608 of the memory block BLOCK2 at the moment t0, which is the first moment, and then the data 0 is stored in the page 610 of the memory block BLOCK3 at the moment t2, and then the data 1 is stored in the page 618 of the memory block BLOCK6 at the moment t4 and the data 2 of the moment t4 is stored in the page 620 of the memory block BLOCK6, the page 602 of the memory block BLOCK2 where the data 0 of the moment t0 is stored, the page 604 of the memory block BLOCK2 where the data 1 of the moment t0 is stored, and the page 606 of the memory block BLOCK2 where the data 2 of the moment t0 is stored become invalid pages. Therefore, the information 641 representing that the data 0 is stored in the page 602 of the memory block BLOCK2, the information 642 representing that the data 1 is stored in the page 604 of the memory block BLOCK2, and the information 643 representing that the data 2 is stored in the page 606 of the memory block 2 BLOCK2 become invalid information in the physical information 640 of the moment t0. In short, the information 641, 642 and 643 in the physical information 640 of the moment t0 are updated into information 682 representing that the data 0 is stored in the page 610 of the memory block BLOCK3, information 686 representing that the data 1 is stored in the page 618 of the memory block BLOCK6, and information 687 representing that the data 2 is stored in the page 620 of the memory block BLOCK6 in the physical information 680 of the moment t4.

In short, the physical information 680 of the moment t4 includes the information 681 representing that the data 3 is stored in the page 608 of the memory block BLOCK2, the information 682 representing that the data 0 is stored in the page 610 of the memory block BLOCK3, the information 683 representing that the data 4 is stored in the page 612 of the memory block BLOCK3, information 684 representing that the data 5 is stored in the page 614 of the memory block BLOCK3, information 685 representing that the data 6 is stored in the page 616 of the memory block BLOCK3, information 686 representing that the data 1 is stored in the page 618 of the memory block BLOCK6, information 687 representing that the data 2 is stored in the page 620 of the memory block BLOCK6 information 688 representing that the data 7 is stored in the page 622 of the memory block BLOCK6, and information 689 representing that the data 8 is stored in the page 624 of the memory block BLOCK6 For example, the ordered pair of the first column of the physical information 680 represents physical position information of the stored data, which is information on the corresponding memory block and page where the data are stored, and the second column represents information on the stored data, which is logical page information of the stored data.

As described earlier with reference to FIGS. 3 and 4, the physical information 680 of the moment t4 that is stored in the second storing unit is stored in the corresponding page (not shown in FIG. 6) of a predetermined memory block among the multiple memory blocks of the memory.

Also, since the data 1, the data 2, the data 7, and the data 8 of the moment t4 are written and stored in the corresponding pages of the corresponding memory block, logical information 670 is stored in a first storing unit. The logical information 670 of the moment t4 includes information 671 representing that the data 1 is stored in the page 618 of the memory block BLOCK6, information 672 representing that the data 2 is stored in the page 620 of the memory block BLOCK6, information 673 representing that the data 7 is stored in the page 522 of the memory block. BLOCK6, and information 674 representing that the data 8 is stored in the page 624 of the memory block BLOCK6. For example, the first column of the logical information 670 represents information on the stored data, which is logical page information of the stored data, and the ordered pair of the second column represents physical position information of the stored data, which is information on the memory block and page where the data are stored.

As described above with reference to FIG. 6, the data storage device in accordance with the embodiment of the present invention updates the data storage information on the data stored in the memory, and particularly updates physical information on an invalid page to efficiently store the physical information when data having the same logical page as stored data is stored in the memory. Therefore, the data storage device in accordance with the embodiment of the present invention may efficiently check out invalid pages by easily checking the physical information and the logical information.

Hereafter, a process for operating the data storage device in accordance with an embodiment of the present invention is described in detail with reference to FIG. 7.

Figure 7:
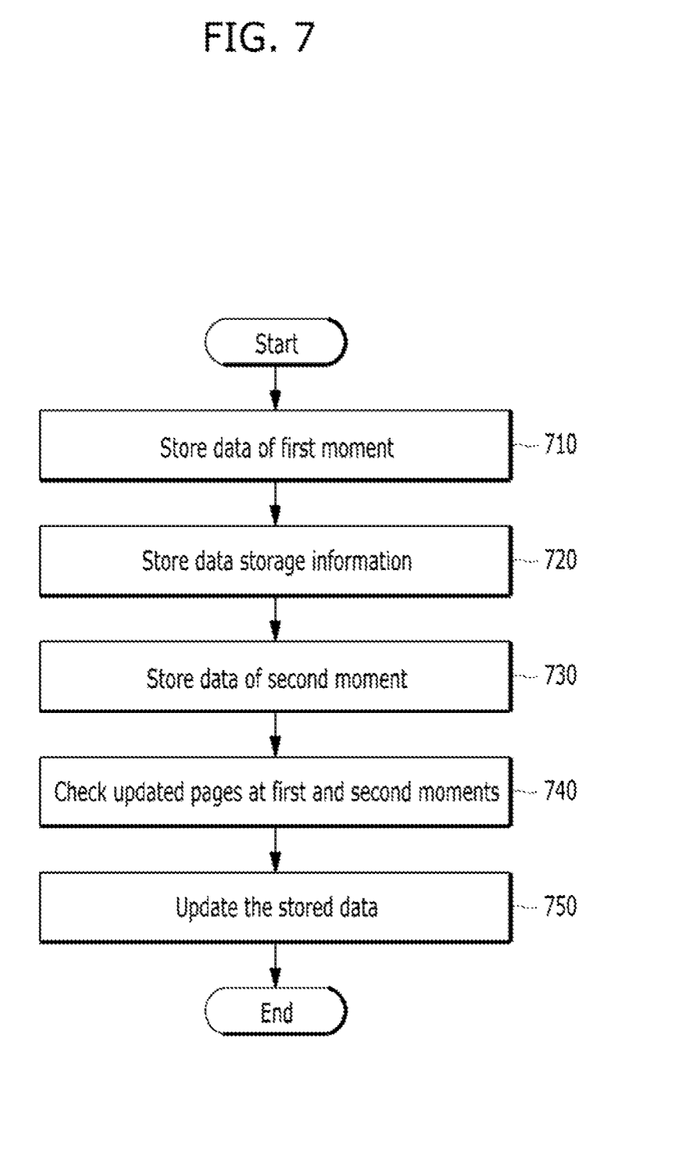
FIG. 7 is a flowchart describing a data storing process in a data storage device in accordance with an embodiment of the present invention.

FIG. 7 is a flowchart describing a data storing process in the data storage device in accordance with the embodiment of the present invention.

Referring to FIG. 7, when data to be stored in a memory through a data write operation is transmitted from a host at a first moment, the data storage device writes and stores the data in the memory in step S710. The data of the first moment are written and stored in corresponding pages of a corresponding memory block.

In step S720, data storage information on the data stored in the corresponding memory block of the memory is stored in a corresponding page of a predetermined memory block among a plurality of blocks of the memory and the storing unit of a controller.

In step S730, when data to be stored in the memory through a data write operation is transmitted from the host at a second moment, the data storage device writes and stores the data in the memory. The data of the second moment are written and stored in corresponding pages of a corresponding memory block.

In step S740, as data having the same logical page information at the first moment at the second moment are stored, pages with updated data are checked. Also, the valid pages and the number of valid pages in the corresponding memory block where the data are stored at the first moment and the second moment are checked out.

In step S750, the data storage information on the data stored in the memory, e.g., physical information, is updated. Particularly, the data storage information of the pages updated by data having the same logical page information is updated. Since the data storing operation of the data storage device in accordance with the embodiment of the present invention is described in detail with reference to FIGS. 2 to 6, further description on it is not provided herein.

According to an embodiment of the present invention, the data storage device and an operation method thereof may efficiently store data storage information of a memory.

While the present invention has been described with respect to specific embodiments, it will be apparent to those skilled in the art that various changes and modifications may be made without departing from the spirit and scope of the invention as defined in the following claims.

What is claimed is:

1. A data storage device comprising:
a memory including a plurality of memory blocks each of which includes a plurality of pages suitable for storing data transmitted from a host; and
a controller suitable for storing data storage information on the data stored in the memory,
wherein the data storage information is updated based on valid pages where the data are stored among the plurality of the pages,
wherein the data storage information is physical to logical information of the data stored in the plurality of the pages and the plurality of the memory blocks, and the physical to logical information is stored in pages of a predetermined memory block among the plurality of the memory blocks,
wherein at a first moment when data of a first group are stored in pages of a first group among the plurality of the pages, the controller stores a first data storage information representing that the data of the first group are stored in the pages of the first group, in page of the predetermined memory block, wherein at a second moment when data of a second group are stored in pages of a second group among the plurality of the pages, if data of the first group and data of the second group have at least one or more same value, the controller updates the first data storage information based on the number of first valid pages among the pages of the first group, and
wherein the controller compares the number of the first valid pages with a first threshold value and the change in the number of the first valid pages with a second threshold value at the second moment to produce a comparison result, and updates a second data storage information into the updated first data storage information based on the comparison result.

2. The data storage device of claim 1, wherein when the number of the first valid pages is equal to or less than a predetermined first threshold value or a change in the number of the first valid pages is equal to or greater than a predetermined second threshold value, the controller updates the first data storage information with a second data storage information representing that the data of the second group are stored in the pages of the second group and stores an updated first data storage information and the second data storage information.

3. The data storage device of claim 2, wherein the controller further updates the first data storage information with a third data storage information corresponding to second valid pages among pages of a third group, which stores the data among the plurality of the pages from the first moment when the data of the first group are stored to the second moment when the data of the second group are stored.

4. The data storage device of claim 2, wherein the controller processes, among the pages of the first group, pages storing data of different logical page information from the data of the second group as the first valid pages, processes the other pages as invalid pages, and processes a fourth data storage information corresponding to the invalid pages as invalid information.

5. The data storage device of claim 4, wherein the controller updates a fifth data storage information corresponding to the first valid pages as the updated first data storage information.

6. A method for operating a data storage device, the method comprising:
storing data transmitted from a host in a memory; and
storing data storage information on the data stored in the memory,
wherein the data are stored in a plurality of pages included in each of a plurality of memory blocks of the memory, and the data storage information is updated based on pages where the data are stored among the plurality of the pages,
wherein the data storage information is physical to logical information of the data stored in the plurality of the pages and the plurality of the memory blocks, and the physical to logical information is stored in pages of a predetermined memory block among the plurality of the memory blocks, and
wherein the storing of the data storage information includes:
at a first moment when data of a first group are stored in pages of a first group among the plurality of the pages, storing a first data storage information representing that the data of the first group are stored in the pages of the first group, in page of the predetermined memory block; and
at a second moment when data of a second group are stored in pages of a second group among the plurality of the pages, if data of the first group and data of the second group have at least one or more same value, updating the first data storage information based on the number of first valid pages among the pages of the first group,
wherein the updating of the first data storage information based on the number of the first valid pages among the pages of the first group includes:
comparing the number of the first valid pages with a first threshold value and the change in the number of the first valid pages with a second threshold value at the second moment to produce a comparison result; and updating a second data storage information into the updated first data storage information based on the comparison result.

7. The method of claim 6, wherein the updating of the first data storage information based on the number of the first valid pages among the pages of the first group includes:
when the number of the first valid pages is equal to or less than a predetermined first threshold value or a change in the number of the first valid pages is equal to or greater than a predetermined second threshold value, updating the first data storage information with a second data storage information representing that the data of the second group are stored in the pages of the second group, and storing an updated first data storage information and the second data storage information.

8. The method of claim 7, wherein the updating of the first data storage information with the second data storage information includes:
updating the first data storage information with a third data storage information corresponding to second valid pages among pages of a third group, which stores the data among the plurality of the pages from the first moment when the data of the first group are stored to the second moment when the data of the second group are stored.

9. The method of claim 7, wherein among the pages of the first group, pages storing data of different logical page information from the data of the second group are processed as the first valid pages and the other pages are processed as invalid pages, and a fourth data storage information corresponding to the invalid pages is processed as invalid information.

10. The method of claim 9, wherein the updating of the first data storage information with the second data storage information includes:
updating a fifth data storage information corresponding to the first valid pages as the updated first data storage information.

* * * * *